United States Patent
Yamazaki

(10) Patent No.: US 8,256,798 B2
(45) Date of Patent: Sep. 4, 2012

(54) AIRBAG

(75) Inventor: Yasuharu Yamazaki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 124 days.

(21) Appl. No.: 12/731,423

(22) Filed: Mar. 25, 2010

(65) Prior Publication Data

US 2010/0244409 A1    Sep. 30, 2010

(30) Foreign Application Priority Data

Mar. 30, 2009    (JP) .................................. 2009-083089

(51) Int. Cl.
*B60R 21/205* (2011.01)
(52) U.S. Cl. ..................... 280/743.1; 280/732
(58) Field of Classification Search ............... 280/728.1, 280/729, 732, 743.1, 743.2
See application file for complete search history.

(56) References Cited

U.S. PATENT DOCUMENTS

| | | | | |
|---|---|---|---|---|
| 7,152,880 B1 * | 12/2006 | Pang et al. | ................. | 280/743.2 |
| 7,243,947 B2 * | 7/2007 | Bosch | ........................ | 280/743.1 |
| 7,360,790 B2 * | 4/2008 | Hasebe et al. | ............. | 280/743.2 |
| 7,540,534 B2 * | 6/2009 | Hasebe et al. | ............. | 280/743.1 |
| 7,806,431 B2 * | 10/2010 | Yamada et al. | ............ | 280/730.1 |
| 7,862,073 B2 * | 1/2011 | Thomas | ........................ | 280/729 |
| 7,866,694 B2 * | 1/2011 | Hanawa et al. | ............ | 280/743.1 |
| 2006/0049618 A1 * | 3/2006 | Bito | .............................. | 280/732 |

FOREIGN PATENT DOCUMENTS

| JP | 2006111255 A | * | 4/2006 |
|---|---|---|---|
| JP | 2006-176018 | | 7/2006 |
| JP | 2007216733 A | * | 8/2007 |
| JP | 2008230414 A | * | 10/2008 |

OTHER PUBLICATIONS

Fukawatase et al., Air Bag, Apr. 27, 2006, JPO, JP 2006-111255 A, English Abstract.*
Fukawatase et al., Air Bag, Apr. 27, 2006, JPO, JP 2006-111255 A, Machine translation of Description.*
Kazuaki Bito, Airbag for Front Passenger Seat, Jul. 6, 2006, JPO, JP 2006-176018 A, Machine translation of Description.*

* cited by examiner

*Primary Examiner* — Faye M Fleming
*Assistant Examiner* — James English
(74) *Attorney, Agent, or Firm* — Smith, Gambrell & Russell, LLP

(57) ABSTRACT

A substantially vertically extending concave portion is provided at a middle part of an impact absorbing face of an airbag body that deploys under a windshield so as to face a front seat occupant. With this configuration, an occupant who is seated in a regular seating position and wearing a seatbelt can be properly protected by preventing the neck area or the like of the occupant from being damaged. In addition, a bulging portion configured to bulge under the windshield and at an upper part of the concave portion is provided to the airbag body. With this configuration, it is possible to properly prevent the head area of an occupant who is not wearing a seatbelt from being damaged directly by the windshield.

13 Claims, 3 Drawing Sheets

[Fig. 1]
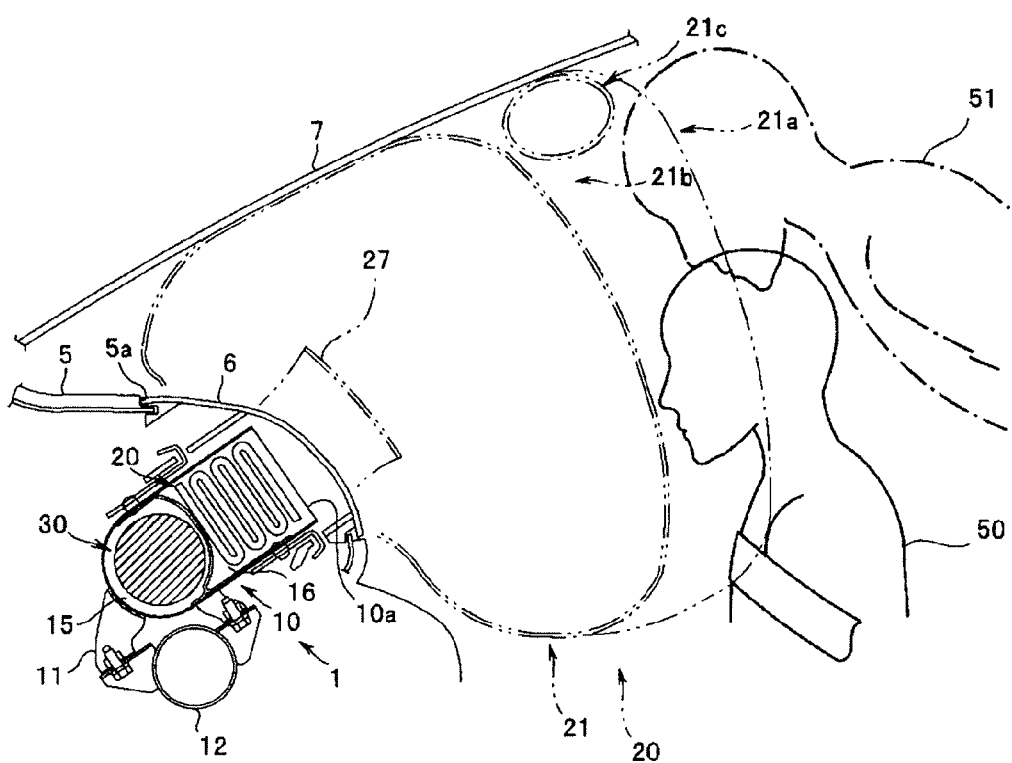

[Fig. 2]
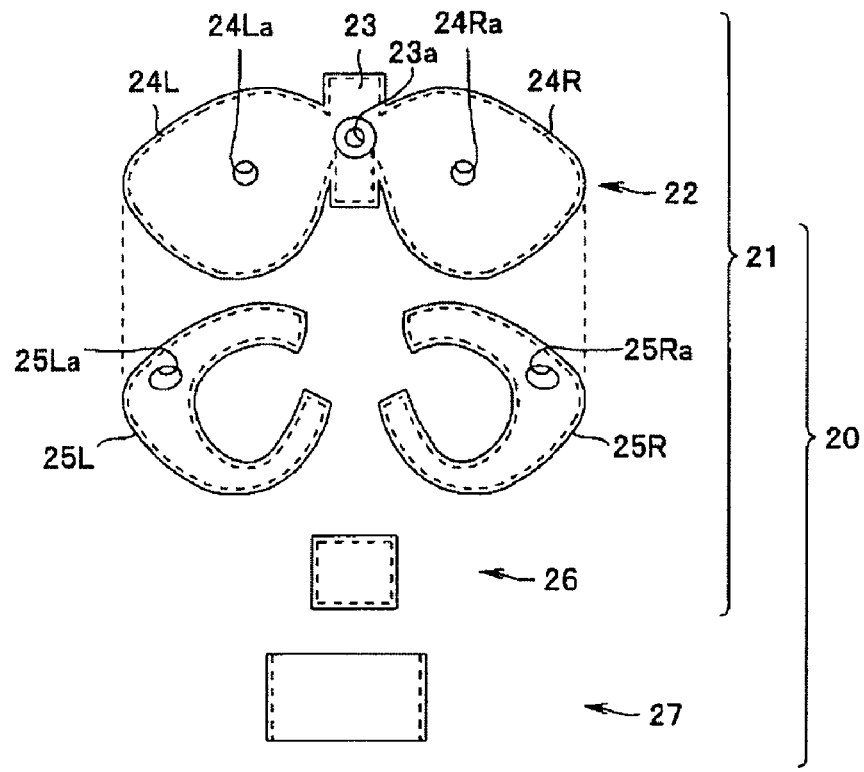
[Fig. 3]
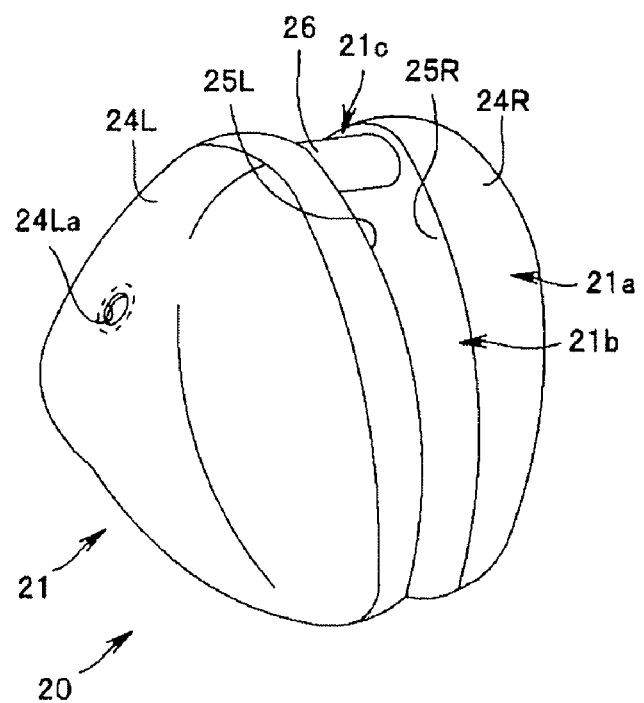

[Fig. 4]
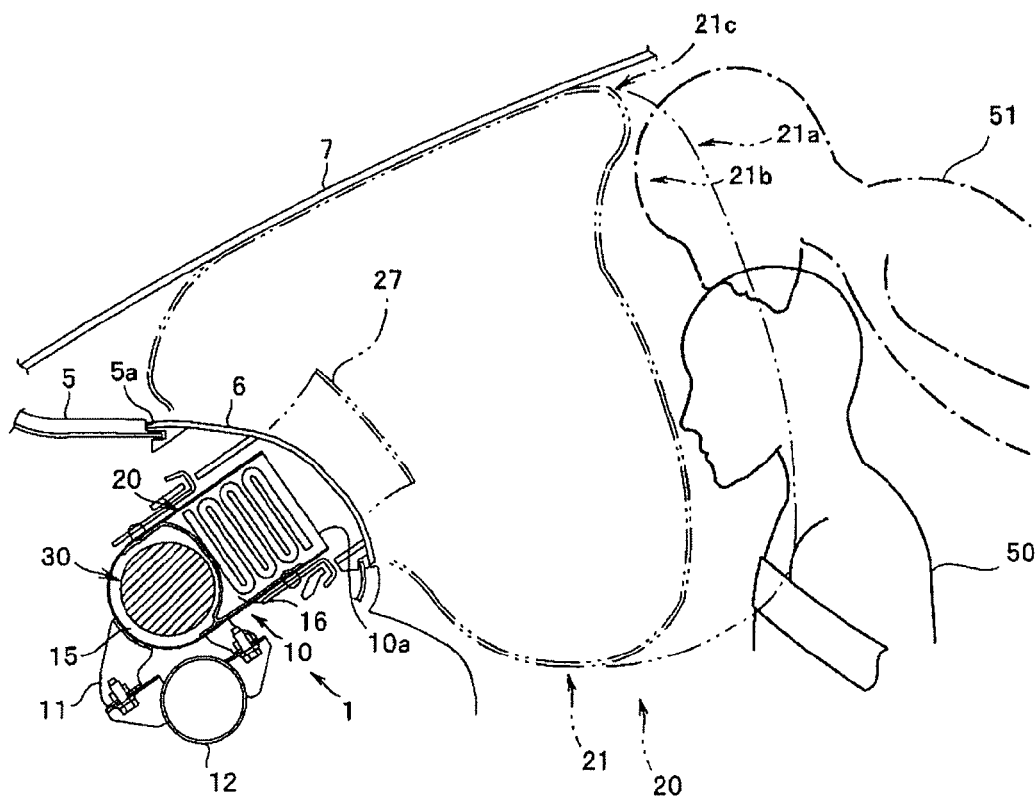
[Fig. 5]
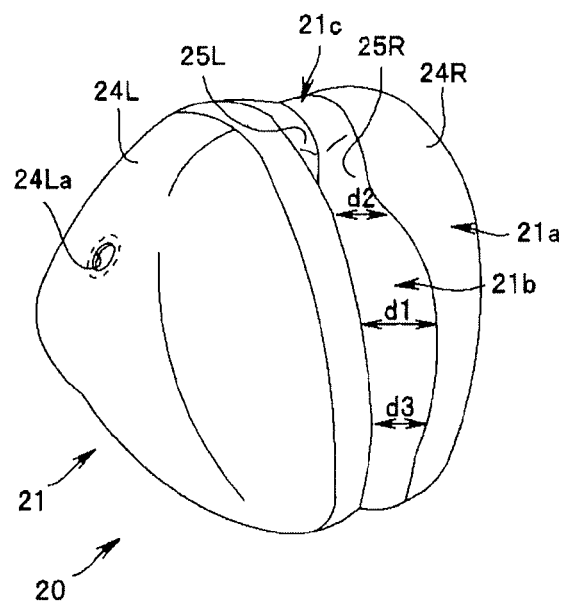

AIRBAG

CROSS-REFERENCE TO RELATED APPLICATIONS

The present application claims priority from Japanese Patent Application No. 2009-083089 filed on Mar. 30, 2009, and is hereby incorporated by reference in its entirety.

BACKGROUND OF THE INVENTION

1. Field of the Invention

The present invention particularly relates to an airbag apparatus that is preferable to protect a front-seat occupant in case of a head-on crush.

2. Description of Related Art

Regarding an airbag apparatus, various approaches have been taken to minimize harm to an occupant when an airbag is deployed. For example, Japanese Patent Application Laid-Open (JP-A) No. 2006-176018 discloses an airbag apparatus of a front occupant seat to which a substantially vertically extending concave portion is provided at a middle part of an airbag in order to reduce injury or the like that is applied to the neck area of the occupant when a small occupant is hit in the head by the airbag.

SUMMARY OF THE INVENTION

However, when a configuration in which a concave portion is provided to an airbag is used as described in the technology of JP-A No. 2006-176018, there is a problem that a relatively large occupant who is not wearing a seatbelt may move in a substantially horizontal direction and be hit in the head against a windshield over the concave portion, for example. This type of problem is obvious especially in a vehicle such as a sports car having a windshield less inclined toward occupants.

The present invention has been made in view of the above problem and has an object to provide an airbag that realizes reduction of harmfulness of the airbag applied to an occupant and protection of the occupant at an improved level, regarding various occupants of different physiques.

An aspect of the present invention is an airbag including: an impact absorbing surface configured to face, under a windshield, a front seat occupant upon deployment; a concave portion that extends in a substantially vertical direction at a middle part of the impact absorbing surface; and a bulging portion configured to bulge immediately under the windshield and at an upper part of the concave portion.

The airbag of the present invention realizes reduction of harmfulness of the airbag applied to an occupant and protection of the occupant at an improved level, regarding various occupants of different physiques.

BRIEF DESCRIPTION OF THE DRAWINGS

FIG. 1 is a general schematic view of an airbag apparatus;
FIG. 2 is an explanatory view of components of an airbag;
FIG. 3 is a perspective view of a deployed airbag;
FIG. 4 is a general schematic view of a modification of the airbag apparatus; and
FIG. 5 is a perspective view of a modification of the deployed airbag.

DETAILED DESCRIPTION OF THE PREFERRED EMBODIMENTS

An embodiment of the present invention will be explained below with reference to the drawings. In FIG. 1, the reference numeral 1 represents an airbag apparatus, especially, one for front occupant seat disposed in an instrument panel 5 in the present embodiment. The airbag apparatus 1 is mainly composed of an airbag 20 and an inflator 30 for supplying inflation gas to the airbag 20, which are housed and held in a case 10.

The case 10 is, for example, formed of a sheet-metal hollow member having a rectangular opening 10a at an upper end thereof and a lower portion of the case 10 is supported by a steering support beam 12 via a bracket 11. In the case 10, a substantially cylindrical inflator container 15 is defined and an airbag housing 16 is formed on an upper portion of the inflator container 15.

The instrument panel 5 has an opening 5a that connects the airbag container 16 (opening 10a) to an area in a vehicle interior side and the opening 5a is closed by a lid 6. When the inflator 30 is activated, the lid 6 is pressed and opened by the airbag 20 toward the vehicle interior so that the opening 5a is opened and the airbag 20 is deployed in the vehicle interior.

An airbag body 21 that is a main part of the airbag 20 is composed of a main cloth 22, a pair of left and right secondary clothes 25L and 25R which are stitched to the main cloth 22, and a cloth 26 that is connected to the secondary clothes 25L and 25R.

The main cloth 22 includes a strip-shaped base 23 that has an intake port 23a for introducing inflation gas from the inflator 30. On both sides of the base 23, a pair of cloth portions 24L and 24R having a rectangular outer shape which are rounded in a predetermined manner are integrally formed. The left and right cloth portions 24L and 24R have exhaust ports 24La and 24Ra respectively for discharging inflation gas.

The secondary clothes 25L and 25R respectively have substantially C-shaped outer shapes which are symmetrical each other and outer edge portions of the secondary clothes 25L and 25R are stitched to outer edge portions of the left and right cloth portions 24L and 24R, respectively. Further, inner edge portions of the left and right secondary clothes 25L and 25R are stitched to each other.

Regarding the stitched clothes 22, 25L and 25R, a surface portion that faces the base 23 upon deployment is formed as an occupant protecting portion (impact absorbing surface) 21a of the airbag body 21 and the occupant protecting portion 21a faces a front seat occupant under a windshield 7. Further, at the middle part of the occupant protecting portion 21a, a concave portion 21b extending in a substantially vertical direction is formed. The concave portion 21b is mainly defined by the secondary clothes 25L and 25R and, in particular, the depth, shape or the like of the concave portion 21b depends on the outer shapes or the like of the secondary clothes 25L and 25R.

Further, the left and right secondary clothes 25L and 25R, which form such a concave portion 21b, have communicating holes 25La and 25Ra respectively at an upper part in the concave portion 21b so as to face each other (see FIG. 2). To the communicating holes 25La and 25Ra, both ends of the cylindrically formed cloth 26 are stitched respectively so that the communicating holes 25La and 25Ra communicate with each other. When the airbag 20 is deployed, inflation gas from the inflator 30 is introduced to the cloth 26 via the communicating holes 25La and 25Ra. Thereby, the cloth 26 forms a bulging portion 21c that bulges at the upper part of the concave portion 21b and immediately under the windshield 7 (see FIGS. 1 and 3).

Here, a straightening cloth 27 is disposed in the airbag body 21 and the straightening cloth 27 is stitched to the base 23 so as to face the intake port 23a.

Next, the airbag 20 having the above configuration will be explained.

For example, as shown in FIG. 1, when a vehicle crash occurs and the airbag 20 is deployed in the vehicle in which an occupant 50 is seated in a regular seating position and wearing a seatbelt, the occupant protecting portion 21a of the airbag body 21 first restrains left and right shoulder areas of the occupant 50 who moves forward due to an impact of the crash. Next, the concave portion 21b of the airbag body 21 restrains the head area of the occupant 50 whose forward momentum is lost when the shoulder areas are restrained. Since the concave portion formed in the middle part of the occupant protecting portion 21a secondarily restrains the head area of the occupant 50 as described above, the impact applied to the head area of the occupant 50 by the airbag body 21 upon the restraint can be reduced. Thus, proper protection of an occupant can be realized while reducing damage applied to the neck area or the like of the occupant, especially an occupant who is relatively short such as a female occupant.

On the other hand, for example, if a vehicle crash occurs when an occupant 51 is in the vehicle without wearing a seatbelt, the head area of the occupant 51 simply moves in a substantially horizontal direction. When the occupant 51 is a relatively large person, the occupant 51 may be hit in the head area against the upper part of the concave portion 21b at an end near the windshield 7; however, the bulging portion 21c that bulges immediately under the windshield 7 is provided at this area and this configuration prevents the head area of the occupant 51 from being damaged directly by the windshield 7.

As described above, according to the present embodiment, since the substantially vertically extending concave portion 21b is provided at the middle part of the occupant protecting portion 21a of the airbag body 21 that deploys under the windshield 7 so as to face a front seat occupant, the occupant is properly protected by preventing damage applied to the neck area or the like of the occupant 50 who is seated in the regular seating position and wearing a seatbelt. In addition, since the bulging portion 21c that bulges immediately under the windshield 7 and at the upper part of the concave portion 21b is provided to the airbag body 21, it is possible to properly prevent the head area of the occupant 51 who is not wearing a seatbelt from being damaged directly by the windshield 7.

Here, in the present invention, the bulging portion 21c is not limited to be a separately formed member (cloth 26) as described above and may be formed by adjusting the depth of the concave portion 21b by changing a part of the shape, stitching or the like of inner edge portions of the left and right secondary clothes 25L and 25R as shown in FIGS. 4 and 5, for example. With such a configuration, the configuration of the airbag body 21 can be simplified.

Further, in order to restrain the head area of the occupant more preferably, the airbag body 21 may be formed such that the concave portion 21b has a relatively wider width d1 at a middle area thereof in a substantially vertical direction than widths d2 and d3 of upper and lower areas thereof as shown in FIG. 5, for example. Such a configuration can easily be realized by changing shapes or stitching of outer edge portions of the left and right cloth portions 24L and 24R and secondary clothes 25L and 25R, for example.

What is claimed is:

1. An airbag comprising:
   an impact absorbing surface configured to face, under a windshield, a front seat occupant upon deployment;
   a concave portion configured to extend in a substantially vertical direction at a middle part of the impact absorbing face;
   a bulging portion configured to bulge immediately under the windshield and at an upper part of the concave portion; and
   a facing sheet which is positioned between the concave portion and an intake port feeding inflation gas to the airbag as to deflect inflation gas originating from the intake port,
   wherein said airbag is formed of first and second laterally exterior sections extending out to opposite sides of the intake port, and first and second laterally interior sections, with said first laterally interior section being fastened with said first laterally exterior section along common peripheral edging, said second laterally interior section being fastened with said second laterally exterior section along common peripheral edging, and said first and second laterally interior sections being joined together along common interior edging such that said interior edging defines a recessed component of the concave portion of said air bag, and
   wherein said first and second laterally exterior sections and said first and second laterally interior sections are configured as to have the concave portion include a relatively wider lateral width at a middle area relative to a vertical extension direction of said concave portion and to have less wide lateral widths above and below that middle area.

2. The airbag according to claim 1, wherein
   the bulging portion is defined by a reduced concave amount section of the concave portion.

3. The airbag according to claim 1 wherein said first and second laterally interior sections are each C-shaped.

4. An airbag comprising:
   an impact absorbing surface configured to face, under a windshield, a front seat occupant upon deployment;
   a concave portion configured to extend in a substantially vertical direction at a middle part of the impact absorbing face;
   a bulging portion configured to bulge immediately under the windshield and at an upper part of the concave portion; and
   a facing sheet which is positioned between the concave portion and an intake port feeding inflation gas to the airbag as to deflect inflation gas originating from the intake port,
   wherein said airbag is formed of first and second laterally exterior sections extending out to opposite sides of the intake port, and first and second laterally interior sections, with said first laterally interior section being fastened with said first laterally exterior section along common peripheral edging, said second laterally interior section being fastened with said second laterally exterior section along common peripheral edging, and said first and second laterally interior sections being joined together along common interior edging such that said interior edging defines a recessed component of the concave portion of said air bag, and
   wherein said first and second laterally exterior sections and said first and second laterally interior sections are configured as to define the bulging portion by a reduction in a concave amount of said concave portion.

5. The airbag according to claim 4 wherein said first and second laterally exterior sections are defined by a common, single sheet of airbag material, and said first and second laterally interior sections by independent sheets of airbag material.

6. The airbag according to claim 5 wherein said first and second laterally interior sections are each C-shaped.

7. An airbag comprising:
an impact absorbing surface configured to face, under a windshield, a front seat occupant upon deployment;
a concave portion configured to extend in a substantially vertical direction at a middle part of the impact absorbing face, and
wherein said airbag comprises first and second laterally exterior sections extending out to opposite sides of an intake port feeding inflation gas to the airbag, and first and second laterally interior sections, and wherein said first laterally interior section is secured to said first laterally exterior section along common peripheral edging, said second laterally interior section is secured to said second laterally exterior section along common peripheral edging, and said first and second laterally interior sections are joined together along common interior edging with said interior edging defining a vertically extending recessed component of the concave portion of said air bag; and
a bulging portion configured to bulge immediately under the windshield and at an upper part of the concave portion, and
wherein the first and second laterally exterior sections and the first and second laterally interior sections are configured as to define the bulging portion by a reduction in a concave amount of said concave portion.

8. The airbag according to claim 7 wherein said first and second laterally exterior sections are defined by a common, single sheet of material, and said first and second laterally interior sections by independent sheets of airbag material.

9. The airbag according to claim 8 wherein said first and second laterally interior sections are each C-shaped.

10. The airbag according to claim 7 wherein said first and second laterally interior sections are each C-shaped.

11. The airbag according to claim 7 further comprising a facing sheet which is positioned between the concave portion and an intake port feeding inflation gas to the airbag as to deflect inflation gas originating from the intake port.

12. The airbag according to claim 7 wherein the peripheral edging defined by said first and second laterally exterior sections are positioned for impact absorption contact with a vehicle occupant.

13. An airbag comprising:
an impact absorbing surface configured to face, under a windshield, a front seat occupant upon deployment;
a concave portion configured to extend in a substantially vertical direction at a middle part of the impact absorbing face, and
wherein said airbag comprises first and second laterally exterior sections extending out to opposite sides of an intake port feeding inflation gas to the airbag, and first and second laterally interior sections, and wherein said first laterally interior section is secured to said first laterally exterior section along common peripheral edging, said second laterally interior section is secured to said second laterally exterior section along common peripheral edging, and said first and second laterally interior sections are joined together along common interior edging with said interior edging defining a vertically extending recessed component of the concave portion of said air bag; and
a bulging portion configured to bulge immediately under the windshield and at an upper part of the concave portion, and
wherein said first and second laterally exterior sections and first and second laterally interior sections are configured as to have the concave portion include a relatively wider lateral width at a middle area relative to a vertical extension direction of said concave portion and to have less wide lateral widths above and below that middle area.

* * * * *